US012097781B2

(12) United States Patent
Ferguson et al.

(10) Patent No.: US 12,097,781 B2

(45) Date of Patent: Sep. 24, 2024

(54) HIGH VOLTAGE BATTERY BYPASS FOR ELECTRIC VEHICLE FLEET

(71) Applicant: GM Cruise Holdings LLC, San Francisco, CA (US)

(72) Inventors: Kenneth Ramon Ferguson, Scottsdale, AZ (US); Adam Mandel-Senft, Phoenix, AZ (US); Brett Lee Rogers, New Hudson, MI (US); Chase Kaufman, Scottsdale, AZ (US); Jeffrey Brandon, Phoenix, AZ (US)

(73) Assignee: GM Cruise Holdings LLC, San Francisco, CA (US)

( * ) Notice: Subject to any disclaimer, the term of this patent is extended or adjusted under 35 U.S.C. 154(b) by 134 days.

(21) Appl. No.: 18/149,751

(22) Filed: Jan. 4, 2023

(65) Prior Publication Data

US 2023/0141841 A1 May 11, 2023

Related U.S. Application Data

(63) Continuation of application No. 16/825,173, filed on Mar. 20, 2020, now Pat. No. 11,560,066.

(51) Int. Cl.

| | |
|---|---|
| ***B60L 53/67*** | (2019.01) |
| ***B60L 53/64*** | (2019.01) |
| ***B60L 53/66*** | (2019.01) |
| ***B60L 53/68*** | (2019.01) |
| ***H02J 7/00*** | (2006.01) |

(52) U.S. Cl.

CPC ............... *B60L 53/67* (2019.02); *B60L 53/64* (2019.02); *B60L 53/66* (2019.02); *B60L 53/68* (2019.02); *H02J 7/0016* (2013.01)

(58) Field of Classification Search

CPC ........................................ B60L 53/67

USPC ........................................ 320/109

See application file for complete search history.

(56) References Cited

U.S. PATENT DOCUMENTS

| | | | | |
|---|---|---|---|---|
| 5,764,469 | A * | 6/1998 | Slepian | H02H 3/207 361/115 |
| 5,850,351 | A * | 12/1998 | Lotfy | H02J 7/0016 340/636.15 |
| 9,991,724 | B2 * | 6/2018 | Kim | B60L 58/15 |
| 10,640,004 | B2 * | 5/2020 | Patel | B60L 58/12 |
| 10,666,070 | B2 * | 5/2020 | Meacham, II | H02J 7/007182 |
| 2004/0073440 | A1 * | 4/2004 | Garbers | G06Q 10/02 705/5 |
| 2008/0079389 | A1 * | 4/2008 | Howell | H02J 7/00306 701/99 |
| 2010/0231162 | A1 * | 9/2010 | Gibson | B60L 8/00 320/101 |

(Continued)

*Primary Examiner* — Jerry D Robbins

(57) ABSTRACT

A system for powering an electric vehicle (EV) includes a battery, a power distribution module, and a battery bypass module. The power distribution module receives power from a charging station, draws power from the battery in a discharging mode, distributes power from the charging station to the battery in a charging mode, and distributes power to a plurality of subsystems of the EV. The battery bypass module is coupled to the battery and the power distribution module. When the battery bypass module is engaged in a charging bypass mode, power distributed by the power distribution module bypasses the battery and is distributed to at least a subset of the plurality of subsystems of the EV.

20 Claims, 3 Drawing Sheets

(56) References Cited

U.S. PATENT DOCUMENTS

| | | | | |
|---|---|---|---|---|
| 2011/0202418 | A1* | 8/2011 | Kempton | G06Q 50/06<br>705/26.1 |
| 2014/0217993 | A1* | 8/2014 | Rousselle | B60L 53/68<br>320/157 |
| 2017/0229903 | A1* | 8/2017 | Jones | H02K 7/1846 |
| 2020/0114778 | A1* | 4/2020 | Fisher | B60L 50/64 |
| 2020/0194996 | A1* | 6/2020 | Fisher | H05K 7/2089 |
| 2024/0047982 | A1* | 2/2024 | Green | B60R 16/033 |

* cited by examiner

HIGH VOLTAGE BATTERY BYPASS FOR ELECTRIC VEHICLE FLEET

CROSS-REFERENCE TO RELATED APPLICATION(S)

This application claims the benefit of and hereby incorporates by reference, for all purposes, the entirety of the contents of U.S. Non-Provisional Application Ser. No. 16/825,173, filed Mar. 20, 2020, and entitled "HIGH VOLTAGE BATTERY BYPASS FOR ELECTRIC VEHICLE FLEET".

TECHNICAL FIELD OF THE DISCLOSURE

The present disclosure relates generally to battery-powered electric vehicles fleets and, more specifically, to systems and methods for powering a battery-powered vehicle from a charger while bypassing the battery.

BACKGROUND

Electric vehicles (EVs) are powered by batteries that need to be periodically charged. Modern direct current (DC) fast-charging electric vehicle chargers can quickly charge EV batteries; for example, a DC fast-charging EV charger may increase the range of an EV by 100 miles in 30 minutes. For fleet operations, EV batteries often fully recharge before the EVs are needed for service, e.g., during night time or other periods of lower demand. In addition, it can be useful to keep some subsystems, such as a communications system, of an EV running while the EV is not in service. If the battery reaches full charge before the EV is put into service again, the subsystems that remain on before service deplete the battery. Then, when the EV is put into service, the battery is no longer fully charged. To avoid this, the EV can continue charging until it is put into service, so that EV has a fully charged battery when it goes into service. However, this continuous charging degrades the battery.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DESCRIPTION OF EXAMPLE EMBODIMENTS OF THE DISCLOSURE

Overview

Figure 1:
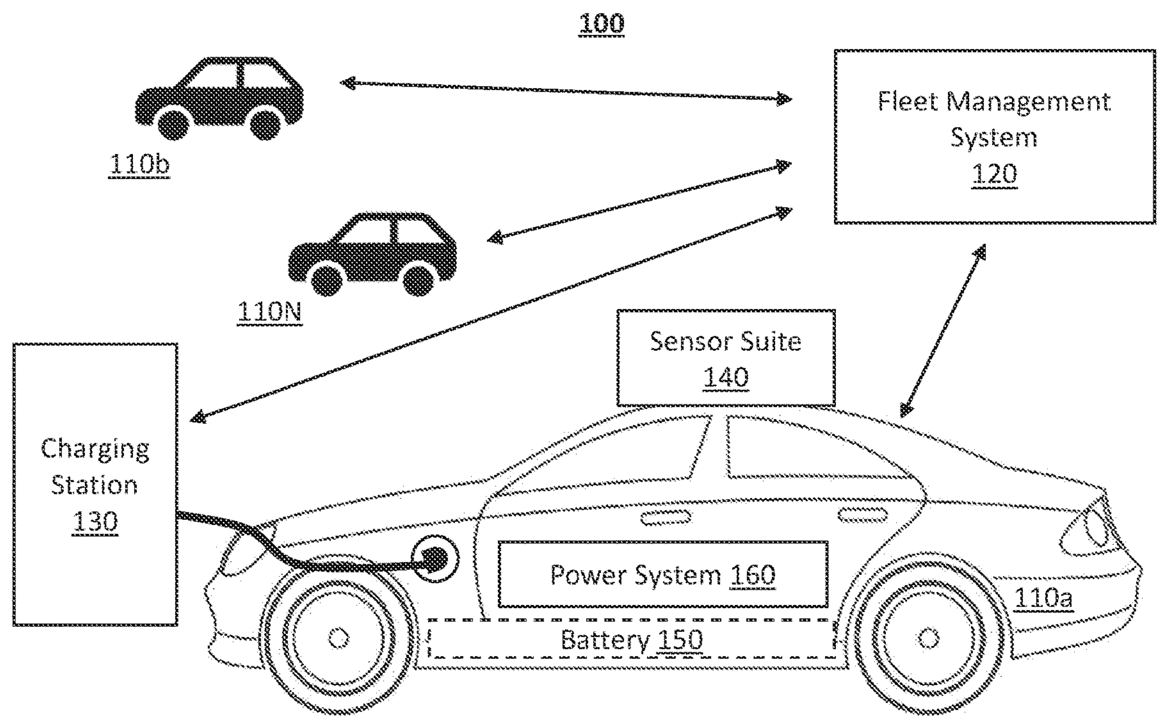
FIG. 1 is a block diagram illustrating a system including an example EV in a fleet of EVs in which powering the EV in a charging bypass mode according to some embodiments of the present disclosure may be implemented.

The systems, methods and devices of this disclosure each have several innovative aspects, no single one of which is solely responsible for the all of the desirable attributes disclosed herein. Details of one or more implementations of the subject matter described in this specification are set forth in the description below and the accompanying drawings.

In current EV fleet management, EV batteries are typically recharged quickly (e.g., at the fastest possible rate for a given EV battery and charging station combination) so that the EVs can return to service. However, oftentimes, an EV is not immediately needed for service after the battery has reached a full charge. For example, if an EV is recharged during a period of low demand (e.g., overnight), the EV may not return to service for several hours (e.g., not until the next morning). For fleet operations, it can be useful to keep some subsystems of the EV running even while the EV is not in service. For example, the EV's communications system is kept running so that a fleet management system can communicate with the EV, e.g., to transmit instructions to go into service, receive status information, send software upgrades, etc. For autonomous EVs, it can be useful to keep autonomous driving hardware (e.g., sensor systems, processing systems) powered on for routine use and monitoring, and to avoid a lengthy restart procedure before the EV can be put back into service. If the EV is disconnected from the charging station after the battery is charged, continuing to operate these subsystems drains the battery, and the EV does not have a fully charged battery when it goes into service. Leaving the EV connected to the charging station even after the battery has been fully charged ensures that the battery remains fully charged; however, leaving the EV plugged into a charging station that provides more power than needed to run these subsystems degrades the battery.

Powering the EV using a charging bypass mode overcomes these problems by enabling the EV to continue to receive power from a charging station without straining the battery. After the battery has reached a full charge, the power distribution module of the EV continues to receive power from the charging station and distribute the power to various subsystems that remain on while the EV is not in service. A battery bypass module causes the power received from the charging station to bypass the battery, so the battery retains its full charge but is not strained by continual charging from the charging station. The charging bypass mode can be selectively engaged and disengaged by a fleet management system, e.g., the fleet management system may instruct an EV to engage the charging bypass mode in response to low demand, or to disengage the charging bypass mode in response to demand by other EVs in the fleet for charging stations.

Embodiments of the present disclosure provide a system for powering an electric vehicle (EV) that includes a battery, a power distribution module, and a battery bypass module. The power distribution module is configured to receive power from a charger, draw power from the battery in a discharging mode, distribute power from the charger to the battery in a charging mode, and distribute power to a plurality of subsystems of the EV. The battery bypass module is coupled to the battery and to the power distribution module. The battery bypass module, when engaged in a charging bypass mode, causes power distributed by the power distribution module from the charger to bypass the battery and to be distributed to at least a subset of the plurality of subsystems of the EV.

Further embodiments of the present disclosure provide a method for powering an EV that includes receiving, at a power distribution module of the EV, power from a charger; during a charging mode, distributing, from the power distribution module, power received from the charger to a battery of the EV; during a discharging mode, drawing, by the power distribution module, power from the battery and distributing the power from the battery to a plurality of subsystems of the EV; and during a charging bypass mode, drawing, by the power distribution module, power from the charger and distributing the power from the charger to the plurality of subsystems of the EV, wherein the power from the charger bypasses the battery during the charging bypass mode.

Further embodiments of the present disclosure provide a fleet management system that includes a vehicle manager and a charging manager. The vehicle manager is configured to receive service requests from users and assign the service requests to EVs in a fleet of EVs. The charging manager is configured to identify, based on data from the vehicle manager, an idle EV of the fleet of EVs, the idle EV not currently assigned by the vehicle manager to a service request. The charging manager is further configured to instruct the idle EV to engage a charging bypass mode while connected to a charging station, the charging bypass mode causing power received from the charging station to bypass a battery of the idle EV and to be distributed to at least a subset of a plurality of subsystems of the idle EV.

As will be appreciated by one skilled in the art, aspects of the present disclosure, in particular aspects of powering an EV in a charging bypass mode, described herein, may be embodied in various manners (e.g., as a method, a system, a computer program product, or a computer-readable storage medium). Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Functions described in this disclosure may be implemented as an algorithm executed by one or more hardware processing units, e.g. one or more microprocessors, of one or more computers. In various embodiments, different steps and portions of the steps of each of the methods described herein may be performed by different processing units. Furthermore, aspects of the present disclosure may take the form of a computer program product embodied in one or more computer-readable medium(s), preferably non-transitory, having computer-readable program code embodied, e.g., stored, thereon. In various embodiments, such a computer program may, for example, be downloaded (updated) to the existing devices and systems (e.g. to the existing perception system devices and/or their controllers, etc.) or be stored upon manufacturing of these devices and systems.

The following detailed description presents various descriptions of specific certain embodiments. However, the innovations described herein can be embodied in a multitude of different ways, for example, as defined and covered by the claims and/or select examples. In the following description, reference is made to the drawings where like reference numerals can indicate identical or functionally similar elements. It will be understood that elements illustrated in the drawings are not necessarily drawn to scale. Moreover, it will be understood that certain embodiments can include more elements than illustrated in a drawing and/or a subset of the elements illustrated in a drawing. Further, some embodiments can incorporate any suitable combination of features from two or more drawings.

The following disclosure describes various illustrative embodiments and examples for implementing the features and functionality of the present disclosure. While particular components, arrangements, and/or features are described below in connection with various example embodiments, these are merely examples used to simplify the present disclosure and are not intended to be limiting. It will of course be appreciated that in the development of any actual embodiment, numerous implementation-specific decisions must be made to achieve the developer's specific goals, including compliance with system, business, and/or legal constraints, which may vary from one implementation to another. Moreover, it will be appreciated that, while such a development effort might be complex and time-consuming; it would nevertheless be a routine undertaking for those of ordinary skill in the art having the benefit of this disclosure.

In the Specification, reference may be made to the spatial relationships between various components and to the spatial orientation of various aspects of components as depicted in the attached drawings. However, as will be recognized by those skilled in the art after a complete reading of the present disclosure, the devices, components, members, apparatuses, etc. described herein may be positioned in any desired orientation. Thus, the use of terms such as "above", "below", "upper", "lower", "top", "bottom", or other similar terms to describe a spatial relationship between various components or to describe the spatial orientation of aspects of such components, should be understood to describe a relative relationship between the components or a spatial orientation of aspects of such components, respectively, as the components described herein may be oriented in any desired direction. When used to describe a range of dimensions or other characteristics (e.g., time, pressure, temperature, length, width, etc.) of an element, operations, and/or conditions, the phrase "between X and Y" represents a range that includes X and Y.

Other features and advantages of the disclosure will be apparent from the following description and the claims.

Example System for Dispatch-Based Charging

FIG. 1 is a block diagram illustrating a system 100 including an example EV in a fleet of EVs in which powering the EV in a charging bypass mode according to some embodiments of the present disclosure may be implemented. The system 100 includes a fleet of electric vehicles (EVs) 110, including EV 110*a*, EV 110*b*, and EV 110N, a fleet management system 120, and a charging station 130. For example, a fleet of EVs may include a number N of EVs, e.g., EV 110*a* through EV 110N. Some or all of the EVs 110 may be autonomous vehicles (AVs). EV 110*a* includes a sensor suite 140, a battery 150, and a power system 160. EVs 110*b* through 110N also include the sensor suite 140, battery 150, and power system 160. A single EV in the fleet is referred to herein as EV 110, and the fleet of EVs is referred to collectively as EVs 110. The fleet management system 120 receives service requests for the EVs 110 and dispatches the EVs 110 to carry out the service requests. During a period when an EV, e.g., EV 110*a*, has a fully charged battery 150 and is not dispatched by the fleet management system 120 to carry out a service request, the power system 160 may engage a charging bypass mode. During the charging bypass mode, the charging station 130 delivers power to the EV 110, but the power bypasses the battery 150.

In some embodiments, each EV 110 is a fully autonomous electric automobile. In other embodiments, each EV 110 may additionally or alternatively be another semi-autonomous or fully autonomous vehicle; e.g., a boat, an unmanned aerial vehicle, a driverless car, etc. Additionally, or alternatively, the EV 110 may be a vehicle that switches between a semi-autonomous state and a fully autonomous state and thus, the EV may have attributes of both a semi-autonomous vehicle and a fully autonomous vehicle depending on the state of the vehicle. In some embodiments, some or all of the EVs 110 are non-autonomous electric vehicles.

In embodiments where the EVs 110 are autonomous, each EV 110 may include a throttle interface that controls an engine throttle, motor speed (e.g., rotational speed of electric motor), or any other movement-enabling mechanism; a brake interface that controls brakes of the EV (or any other movement-retarding mechanism); and a steering interface that controls steering of the EV (e.g., by changing the angle of wheels of the EV). The EV 110 may additionally or alternatively include interfaces for control of any other vehicle functions; e.g., windshield wipers, headlights, turn indicators, air conditioning, etc.

The EV 110 includes a sensor suite 140, which includes a computer vision ("CV") system, localization sensors, and driving sensors. For example, the sensor suite 140 may include photodetectors, cameras, radar, sonar, lidar, GPS, wheel speed sensors, inertial measurement units (IMUS), accelerometers, microphones, strain gauges, pressure monitors, barometers, thermometers, altimeters, ambient light sensors, etc. The sensors may be located in various positions in and around the EV 110.

An onboard computer (not shown in FIG. 1) is connected to the sensor suite 140 and functions to control the EV 110 and to process sensed data from the sensor suite 140 and/or other sensors in order to determine the state of the EV 110. Based upon the vehicle state and programmed instructions, the onboard computer modifies or controls behavior of the EV 110. The onboard computer is preferably a general-purpose computer adapted for I/O communication with vehicle control systems and sensor suite 140, but may additionally or alternatively be any suitable computing device. The onboard computer is preferably connected to the Internet via a wireless connection (e.g., via a cellular data connection). Additionally or alternatively, the onboard computer may be coupled to any number of wireless or wired communication systems.

The battery 150 is a rechargeable high voltage battery that powers the EV 110. The battery 150 may be a lithium-ion battery, a lithium polymer battery, a lead-acid battery, a nickel-metal hydride battery, a sodium nickel chloride ("zebra") battery, a lithium-titanate battery, or another type of rechargeable battery. In some embodiments, the EV 110 is a hybrid electric vehicle that also includes an internal combustion engine for powering the EV 110, e.g., when the battery 150 has low charge.

The power system 160 controls the power and operation of the battery 150, as well as the distribution of power within the EV. The power system 160 switches between various power modes, including (1) a charging mode, in which the battery 150 is charged from the charging station 130, which may also power one or more subsystems of the EV 110, (2) a discharging mode, in which the battery 150 is discharged and power drawn from the battery 150 powers one or more subsystems of the EV 110, and (3) a charging bypass mode, in which one or more subsystems of the EV 110 receive power from a charging station 130, and power drawn from the charging station 130 bypasses the battery 150. The power system 160 may include or interface with battery sensors for determining a current charge level of the battery 150. The power system 160 interfaces with the charging station 130 to initiate charging, request a specific charging rate, and end a charging session. The power system 160 may coordinate power distribution to various subsystems; for example, during charging, the power system 160 distributes power to one subset of subsystems (e.g., a communication subsystem and an autonomous driving sensor subsystem) and does not provide power to a different set of subsystems (e.g., a propulsion subsystem); during operation of the EV 110, the power system 160 distributes power to a different subset of subsystems (e.g., a subset that includes the propulsion subsystem), or all to subsystems of the EV 110. The power system 160 is described further in relation to FIG. 2.

The fleet management system 120 manages the fleet of EVs 110. The fleet management system 120 may manage a service that provides or uses the EVs 110, e.g., a service for providing rides to users with the EVs 110, or a service that delivers items, such as prepared foods, groceries, or packages, using the EVs 110. The fleet management system 120 may select an EV from the fleet of EVs 110 to perform a particular service or other task, and instruct the selected EV (e.g., EV 110*a*) to autonomously drive to a particular location (e.g., a delivery address). The fleet management system 120 also manages fleet maintenance tasks, such as charging and servicing of the EVs 110. As shown in FIG. 1, each of the EVs 110 communicates with the fleet management system 120. The EVs 110 and fleet management system 120 may connect over a public network, such as the Internet. The fleet management system 120 is described further in relation to FIG. 2.

The charging station 130 charges batteries of EVs 110. The charging station 130 shown in FIG. 1 has a cord and a plug; the plug is plugged into a socket of the EV 110*a*. In other embodiments, the charging station 130 is a wireless charger, e.g., an inductive charger, or another type of charger. The charging station 130 may provide an alternating current (AC), such as an AC level 2 charger, or the charging station 130 may provide a direct current (DC), which may deliver charge at a faster rate. The charging station 130 may be configured to charge multiple EVs 110 simultaneously. The charging station 130 may communicate with the EV 110*a* through a wired connection (e.g., through the cord and plug shown in FIG. 1) or through a wireless connection (e.g., Bluetooth or WiFi). The charging station 130 may also communicate with the fleet management system 120, e.g., over the Internet.

The fleet management system 120 may operate a network of charging stations 130. The network of charging stations may include a single type of charging stations (e.g., DC fast-charging stations), or a mix of charging stations (e.g., some AC level 2 charging stations, and some DC charging stations). Charging stations in the network may be distributed across one or more geographic regions in which the fleet of EVs 110 provides service. Charging stations may be included in EV facilities operated by the fleet management system 120, e.g., facilities for storing, charging, and/or maintaining EVs. In some embodiments, the EVs 110 may use charging stations outside of the network operated by the fleet management system 120, e.g., charging stations available to the public, charging stations in private homes, charging stations on corporate campuses, etc.

Example Power System

Figure 2:
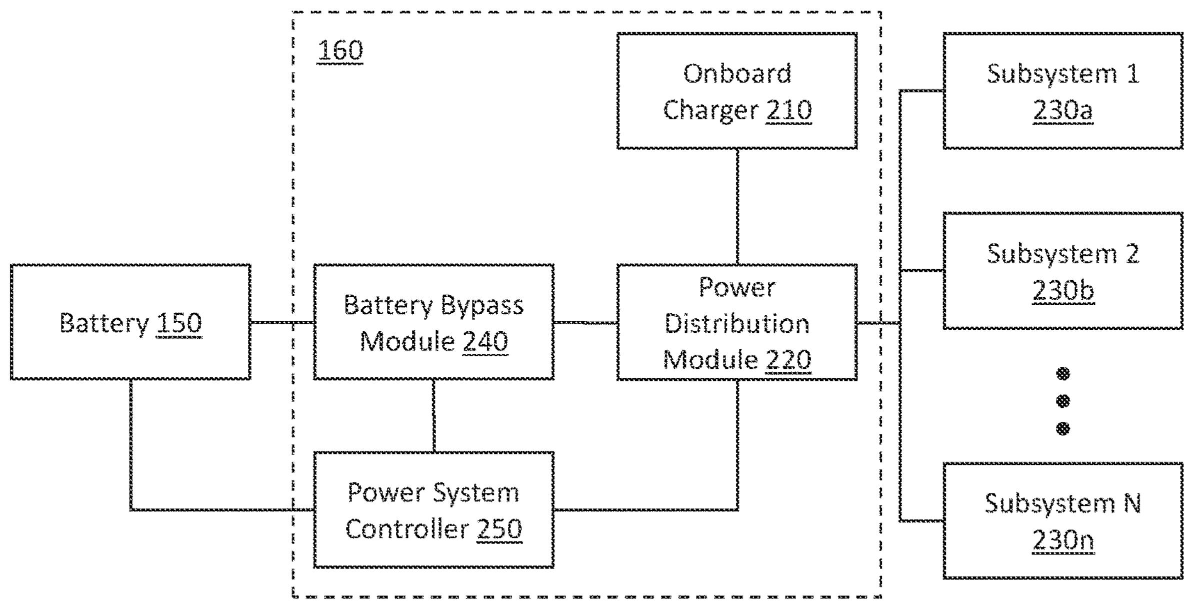
FIG. 2 is a block diagram illustrating a power system for powering various vehicle subsystems according to some embodiments of the present disclosure.

FIG. 2 is a block diagram illustrating a power system for powering various vehicle subsystems according to some embodiments of the present disclosure. The block diagram includes the battery 150, the power system 160, and various EV subsystems 230*a* through 230N. The power system 160 includes an on-board charger 210, a power distribution module 220, a battery bypass module 240, and a power system controller 250. In alternative configurations, different and/or additional components may be included in the power system 160. Further, functionality attributed to one component of the power system 160 may be accomplished by a different component included in the power system 160 or a different system than those illustrated.

The on-board charger 210 connects to a charging station 130 and converts alternating current (AC) output by the charging station 130 to direct current (DC) for storage in the battery 150 and for powering the subsystems 230. The on-board charger 210 is used when the EV 110 is being charged by a charging station 130 that delivers AC. If the charging station 130 delivers DC, the on-board charger 210 is bypassed, and power is delivered directly from the charging station 130 to the power distribution module 220.

The power distribution module 220 receives and distributes power to various components of the EV 110. During charging, the power distribution module 220 receives power from the charging station 130, either via the on-board charger 210 or directly from the charging station 130. During operation of the EV 110, when the battery 150 powers the EV 110 in a discharging mode, the power distribution module 220 draws power from the battery 150. The power distribution module 220 distributes power from the charging station 130 to the battery 150 during charging. The power distribution module 220 distributes power to the subsystems 230*a*-230N.

Subsystems 230*a*-230N represent various subsystems of the EV 110 that are powered by the battery 150 or the charging station 130, depending on the current power mode of the EV 110. For example, subsystem 1 230*a* may be a vehicle propulsion system that draws power only when the EV 110 is in service (i.e., during the discharging mode), and subsystem 2 230*b* may be a communications system that draws power whether the EV 110 is idle or in service (i.e., during the charging mode, discharging mode, and charging bypass mode). Other subsystems include, for example, steering, braking, AV systems (such as the sensor suite 140 and signal processing systems), lighting, user interfaces, HVAC, etc. A single EV subsystem is referred to herein as subsystem 230, and the collection of subsystems are referred to collectively as subsystems 230.

The battery bypass module 240 is coupled to the battery 150 and power distribution module 220 and places the battery 150 in a charging bypass mode. The battery bypass module 240 may be a modified battery disconnect unit with additional switching capabilities, allowing the battery disconnect unit to be selectively engaged and disengaged. During charging and discharging modes, the battery bypass module 240 is not engaged, allowing power to flow between the battery 150 and the power distribution module 220. During the charging bypass mode, the battery bypass module 240 is engaged, which disconnects the battery 150 from the power distribution module 220. During charging bypass mode, the power distribution module 220 receives power from the charging station 130 and distributes the power to one or more of the subsystems 230 while bypassing the battery 150. In some embodiments, the battery bypass module 240 comprises an additional switch (not shown) for connecting the on-board charger 210 when in use and disconnecting the on-board charger 210 when not in use. In some embodiments, the battery bypass module 240 comprises an additional switch (not shown) for connecting the power distribution module 220 to a plug for the external DC charger and disconnecting the plug when the external DC charger is not in use.

The power system controller 250 controls the other components of the power system 160. The power system controller 250 interfaces with the battery bypass module 240 to engage and disengage the charging bypass mode. The power system controller 250 may connect to the battery 150 and interface with battery sensors to determine a current charge level of the battery 150. The power system controller 250 interfaces with the power distribution module 220 to instruct the power distribution module 220 to distribute power to particular subsystems 230, or to instruct the power distribution module 220 to not distribute power to particular subsystems 230.

The power system controller 250 may identify subsystems 230 to power or not to power based on the power mode, e.g., powering some systems during the discharging mode but not during the charging mode or charging bypass mode. For example, the power system controller 250 selects at least one subsystem (e.g., a communications subsystem) to enable during the charging bypass mode, and transmits instructions to the power distribution module 220 to distribute power to the selected subsystem. The power system controller 250 may also select at least a second subsystem (e.g., a propulsion subsystem) to disable during the charging bypass mode, and transmit instructions to the power distribution module 220 not to distribute power to the second subsystem. The power system controller 250 may determine whether or not to power a subsystem based on the power mode and/or other rules. For example, during nighttime, the power system controller 250 instructs the power distribution module 220 to power the lighting subsystem, but during daytime, the lighting subsystem is powered off.

In some embodiments, the power system controller 250 receives instructions from the fleet management system 120 to engage or disengage the charging bypass mode of the battery bypass module 240, and the power system controller 250 engages or disengages the charging bypass mode responsive to the instructions. In some embodiments, the power system controller 250 determines when to engage or disengage the charging bypass mode. For example, the EV 110 is connected to a charging station 130 and is drawing power from it. The power system controller 250 determines that the battery 150 has reached a full charge level, e.g., by receiving a signal from the battery 150 indicating that the battery 150 has a full charge. In response to the battery 150 reaching the full charge level, the power system controller 250 engages the charging bypass mode of the battery bypass module 240. In response to the EV 110 disconnecting from the charging station 130, e.g., when the EV 110 is assigned to a task, the power system controller 250 disengages the charging bypass mode of the battery bypass module 240.

In some embodiments, the EV 110 includes multiple batteries 150, e.g., a first battery used to power vehicle propulsion and maneuvering systems, and a second battery used to power AV hardware (e.g., the sensor suite 140 and the onboard computer). In such embodiments, the power system controller 250 manages charging of the multiple batteries. For example, the power system controller 250 instructs the power distribution module 220 to distribute power received from the on-board charger 210 or an external DC charger between the multiple batteries. The power system controller 250 also managers discharging of the multiple batteries, such as by instructing the power distribution module 220 to draw power from a particular battery or batteries and distribute the power to different subsystems. In some embodiments, each battery is associated with a respective power distribution module for distributing power from the battery to a respective subset of subsystems. The power system controller 250 may instruct the battery bypass module 240 to engage a charging bypass mode for each battery individually. For example, if the EV 110 is drawing power from a charging station, and one battery reaches full charge before a second battery, the power system controller 250 engages a charging bypass mode for the first battery and not the second battery. In some embodiments, each battery is coupled to a respective battery bypass module 240 configured to engage or disengage the charging bypass mode for its coupled battery, and the power system controller 250 engages the charging bypass mode for each battery bypass module 240 individually.

Example Fleet Management System

Figure 3:
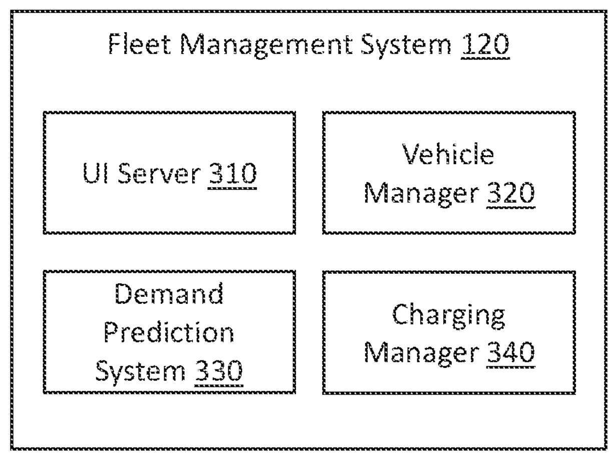
FIG. 3 is a block diagram illustrating a fleet management system according to some embodiments of the present disclosure.

FIG. 3 is a block diagram illustrating the fleet management system 120 according to some embodiments of the present disclosure. The fleet management system 120 includes a UI (user interface) server 310, a vehicle manager 320, a demand prediction system 330, and a charging manager 340. In alternative configurations, different and/or additional components may be included in the fleet management system 120. Further, functionality attributed to one component of the fleet management system 120 may be accomplished by a different component included in the fleet management system 120 or a different system than those illustrated.

The UI server 310 is configured to communicate with client devices that provide a user interface to users. For example, the UI server 310 may be a web server that provides a browser-based application to client devices, or the UI server 310 may be a mobile app server that interfaces with a mobile app installed on client devices. The user interface enables the user to access a service of the fleet management system 120, e.g., to request a ride from an EV 110, or to request a delivery from an EV 110.

The vehicle manager 320 manages and communicates with a fleet of EVs, including EVs 110*a* through 110N. The UI server 310 transmits service requests received from users to the vehicle manager 320, and the vehicle manager 320 assigns EVs 110 to the service requests. More broadly, the vehicle manager 320 directs the movements of the EVs 110 in the fleet. The vehicle manager 320 may instruct EVs 110 to drive to other locations while not servicing a user, e.g., to improve geographic distribution of the fleet, to anticipate demand at particular locations, to drive to a charging station 130 for charging, etc. The vehicle manager 320 also instructs EVs 110 to return to EV facilities for recharging, maintenance, or storage. The vehicle manager 320 may receive data describing the current battery levels of the EVs 110 in the fleet, and based on the battery levels and current or predicted user demands, determine when EVs 110 in the fleet should be recharged.

In an embodiment, the UI server 310 receives a service request from a user, such as a request for a ride. The vehicle manager 320 identifies two eligible EVs that are charged and available to carry out assignments. The vehicle manager 320 assigns the request to one of the EVs. The vehicle manager 320 may inform the charging manager 340 that the other EV, which has not been assigned to carry out an assignment, is idle; based on this information, the charging manager 340 may instruct the idle EV to enter a charging bypass mode, while it awaits an assignment. If the UI server 310 receives another service request, e.g., a request for food delivery, that can be carried out by the idle EV, the vehicle manager 320 may assign the request to the idle EV, which disengages the charging bypass mode and services the request.

In some embodiments, the fleet management system 120 includes a demand prediction system 330 that predicts a demand for the fleet of EVs 110. The demand prediction system 330 retrieves historical data describing previous demands on the fleet of EVs 110, e.g., data describing numbers of assignments, durations of assignments, locations of assignments, and timing of assignments (day of week, time of day). The demand prediction system 330 uses this historical data to predict the demand for the fleet of EVs. In one example, the demand prediction system 330 predicts the demand levels for a period of time in the future, e.g., predicted demand over the next 5 hours, or predicted demand over the next 24 hours. In some embodiments, the demand prediction system 330 predicts an overall demand level or curve for the whole fleet, e.g., if the fleet is dedicated to one task (e.g., food delivery) and a particular region. In other embodiments, the demand prediction system 330 determines different demand levels or curves for various segments of the fleet, e.g., for a particular type of EVs (e.g., trucks, sedans, or luxury cars), for EVs within a particular geographic region, for EVs assigned to a particular function (e.g., EVs assigned to hot food delivery, EVs assigned to package delivery, or EVs assigned to giving rides to users), or a combination of factors (e.g., luxury cars used for a ride-sharing service within Austin, TX).

The vehicle manager 320 may use demand predictions from the demand prediction system 330 to assign EVs in the fleet to received assignments. For example, the vehicle manager 320 may instruct EVs to complete assignments, or to relocate in anticipation of predicted assignments, such that geographic distribution of the fleet can meet a predicted upcoming demand. The charging manager 340 may use demand predictions from the demand prediction system 330 to make charging decisions for the fleet of EVs, e.g., whether to maximize the number of EVs with a full charge due to a predicted high demand, or to allow some EVs in the fleet to be stored with emptier batteries while other EVs are placed in charging bypass mode to reduce strain and degradation of the batteries across the fleet.

The charging manager 340 manages charging of the EVs 110. The charging manager 340 may instruct an EV 110 to apply a particular power mode, e.g., charging mode, discharging mode, or charging bypass mode. The charging manager 340 may coordinate charging across the fleet of EVs 110. For example, the charging manager 340 monitors use of and demand on a set of charging stations 130 and instructs EVs 110 whether to charge based on the charging station demand. The charging manager 340 may also analyze various costs associated with different power modes and select a power mode for an EV 110 based on the costs. The charging manager 340 is described further in relation to FIG. 4.

Example Charging Manager

Figure 4:
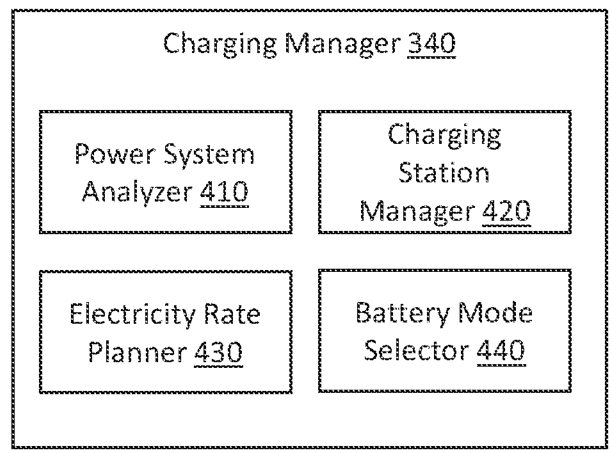
FIG. 4 is a block diagram illustrating a charging manager according to some embodiments of the present disclosure.

FIG. 4 is a block diagram illustrating the charging manager 340 according to some embodiments of the present disclosure. The charging manager 340 includes a power system analyzer 410, a charging station manager 420, an electricity rate planner 430, and a power mode selector 440. In alternative configurations, different and/or additional components may be included in the charging manager 340. Further, functionality attributed to one component of the charging manager 340 may be accomplished by a different component included in the charging manager 340 or a different system than those illustrated. While the charging manager 340 is shown as a subsystem of the fleet management system 120, in other embodiments, some or all of the components of the charging manager 340 are integrated into other systems, such as the charging station 130 or the EV 110. For example, the charging station manager 420, or some aspects of the charging station manager 420, may be implemented by the charging station 130. As another example, the power system analyzer 410 and/or the power mode selector 440 may be implemented by the EV 110.

The power system analyzer 410 retrieves and processes data related to the battery 150 and power system 160. The power system analyzer 410 may store data describing power use of the various subsystems 230, including historical power usage and conditions that impact the power usage, such as weather conditions, ambient light, driving style, roadway conditions (e.g., speed, roadway type, terrain), frequency of stops, etc. The power system analyzer 410 can predict the power draws on the battery 150 or charging station 130 under specified conditions. In particular, the power system analyzer 410 can receive data identifying a set of subsystems 230 to power, and calculate an estimated power draw rate for powering the set of subsystems 230 based on the data describing the current conditions and data describing the historical power usage of the set of subsystems 230. In some embodiments, the power system analyzer 410 may calculate the estimated power draw rate based on historical subsystem power draw data collected across multiple EVs in the fleet.

The power system analyzer 410 may also store data describing previous charge events and discharge events of the battery 150 and/or a set of batteries 150 the fleet of EVs 110. For example, the data describing charge events includes charge levels, changes in the charge level, and charging rate supplied by a power source (e.g., a charging station 130, regenerative braking, or other sources). The data describing discharge events may include charge levels, changes in charge levels, and power draws on the battery 150 from various subsystems 230. The power system analyzer 410 can also predict the response of the battery 150 to planned charge and discharge events based on the historical battery data for the battery 150 and/or battery data for multiple batteries across the fleet of EVs 110.

In some embodiments, the power system analyzer 410 also uses the historical charging data to determine the length of time for the battery 150 to reach a target charge level (e.g., a full charge level) from the current charge level when charging at a charging station 130. The power system analyzer 410 may account for a power draw from subsystems 230 that remain on during charging when calculating the length of time to reach the target charge level. The power system analyzer 410 may continually update the length of time to reach the target charge level during charging in response to updated data about the power draws, target charge level, and current charge level. The power system analyzer 410 may provide the time to reach the target charge level to the vehicle manager 320, which determines when the EV 110 is predicted to be available for service.

The power system analyzer 410 may also assess and predict degradation of the battery 150 based on the historical battery data and fleet-wide battery information. In an example, the power system analyzer 410 retrieves data describing degradation costs on the battery 150 due to charging and discharging events. The data may include, for example, degradation costs of charging the battery 150 at different charging rates; degradation costs of storing the battery 150 at different charge levels; and degradation costs of powering the EV 110 or a set of subsystems 230 with the battery 150, which may include the cost of recharging the battery 150 to compensate for the power provided. In general, discharging and recharging a battery degrades the battery, and storing a battery with a higher charge degrades the battery more than storing a battery at a lower charge. The power system analyzer 410 may calculate the degradation costs for a particular battery 150 based on the age of the battery, current state of the battery (e.g., full charge level that the battery can currently receive vs. full charge level when new; current time to reach full charge from empty vs. time to reach full charge when new), environmental conditions, or other factors in combination with historical battery data.

The charging station manager 420 retrieves and processes data related to the charging stations 130. The charging station manager 420 may maintain data describing the type and charging rate for each charging station 130 that charges the fleet of EVs 110. The charging station manager 420 may maintain data describing demand for the charging stations 130 by the EVs 110 in the fleet. For example, the charging station manager 420 maintains a charging queue for each charging station 130, where the charging queue lists EVs 110 waiting to use the charging station 130 and/or en route to the charging station 130. As another example, the charging station manager 420 receives data describing projected demands on the charging stations 130 from the vehicle manager 320, which determines when EVs 110 in the fleet should be recharged based on current battery levels across the fleet and current and/or projected service demands. The charging station manager 420 may select a particular charging station 130 at which an EV 110 recharges based on the location of the EV 110 relative to the charging station 130, whether there is an EV currently charging at the charging station 130 and the expected remaining charge duration of the currently charging EV, a queue of EVs waiting to charge at the charging station 130, the maximum charging rate provided by the charging station 130, or other factors.

The electricity rate planner 430 determines energy costs for drawing power from a charging station 130. In some embodiments, the electricity rate planner 430 retrieves data describing current and future energy costs (e.g., energy costs for the next 24 hours) from an electricity company or another source. In some embodiments, the electricity rate planner 430 determines anticipated energy costs over a period of time (e.g., the next 12 hours) based on the current energy cost and historical data stored by the electricity rate planner 430 or retrieved from another source. The electricity rate planner 430 may determine different anticipated energy costs for multiple different charging stations 130, e.g., charging stations that receive power from different energy companies may have different rates, and a charging station that is fully or partially solar powered may have a lower rate or no fee.

The power mode selector 440 selects a power mode for powering an EV 110, e.g., discharging mode, charging mode, or charging bypass mode. The power mode selector 440 selects a power mode based on data from the power system analyzer 410, charging station manager 420, and/or electricity rate planner 430. In some embodiments, the power mode selector 440 selects a power mode based on fleet-wide considerations, such as demand for services provided by the fleet, demand for charging stations by the fleet, operating costs, and/or degradation costs. The power mode selector 440 may transmit instructions to the power system controller 250 to implement a power mode. In some embodiments, either the power system controller 250 or the power mode selector 440 selects the power mode for the EV 110. In other embodiments, the power mode selector 440 is incorporated into the power system controller 250, and the power mode selector 440 receives data from the fleet management system 120 that the power mode selector 440 may use to determine the power mode. In still other embodiments, the power system controller 250 selects a power mode for the EV 110, and the power mode selector 440 may override the power mode selected by the power system controller 250.

In an embodiment, the power mode selector 440 retrieves charging station data from the charging station manager 420. For example, when an EV 110 is charging at a charging station 130, the charging station manager 420 identifies the charging station 130 that is charging the EV 110, retrieves data describing the demand for the charging station 130 (e.g., predicted demand or a current charging queue), and provides this charging station demand data to the power mode selector 440. If the power mode selector 440 determines that the charging station 130 is available to the EV 110 after the battery 150 has reached a full charge, the power mode selector 440 instructs the EV 110 to engage the charging bypass mode. Alternatively, if the power mode selector 440 determines that the charging station 130 is not available, e.g., another EV is waiting to charge, the power mode selector 440 instructs the EV 110 to enter the discharging mode and disconnect from the charging station 130.

In an embodiment, the power mode selector 440 determines whether to engage the charging bypass mode by comparing the cost of drawing power from the charging station 130 to the costs associated with powering the EV 110 from the battery 150. In particular, the power mode selector 440 determines a cost of powering a subset of subsystems 230, e.g., subsystems 230 that continue operating while the EV 110 is not in service, by the charging station 130, and determines the cost of powering this subset of subsystems 230 from the battery. If the cost of powering the subset of subsystems by the charging station 130 is lower than the cost of powering the subset of subsystems from the battery 150, the power mode selector 440 instructs the EV 110 to engage the charging bypass mode.

To determine the cost of powering the subset of subsystems 230 from the charging station 130, the power mode selector 440 may retrieve an estimated power draw rate for the subset of subsystems 230 from the power system analyzer 410, and retrieve current electricity rates for the charging station 130 from the electricity rate planner 430. The power mode selector 440 calculates the cost of powering the subset of subsystems 230 based on the current electricity rates and the estimated power draw, i.e., by multiplying the power draw by the electricity rate to determine a cost rate for utilizing the charging station 130 in charging bypass mode.

To determine the cost of powering the subset of subsystems 230 from the battery 150, the power mode selector 440 retrieves the degradation cost to the battery 150 associated with powering the subset of subsystems 230 from the power system analyzer 410. The degradation cost may be a cost rate, e.g., the battery 150 degrades by $0.10 for each hour the battery 150 is used to power a given subset of subsystems 230. The power mode selector 440 retrieves an estimated electricity rate for recharging the battery 150 (e.g., from the charging station 130 or from a different charging station) from the electricity rate planner 430. For example, the power mode selector 440 may retrieve the lowest expected electricity rate over the next 12 hours, to minimize recharging costs. The power mode selector 440 determines the cost of powering the subset of subsystems 230 from the battery 150 based on the degradation cost and the estimated cost of recharging the battery, e.g., by adding the degradation cost rate to the estimated electricity rate to calculate an overall cost rate of using battery power.

Example Processes for Selecting and Applying a Power Mode

Figure 5:
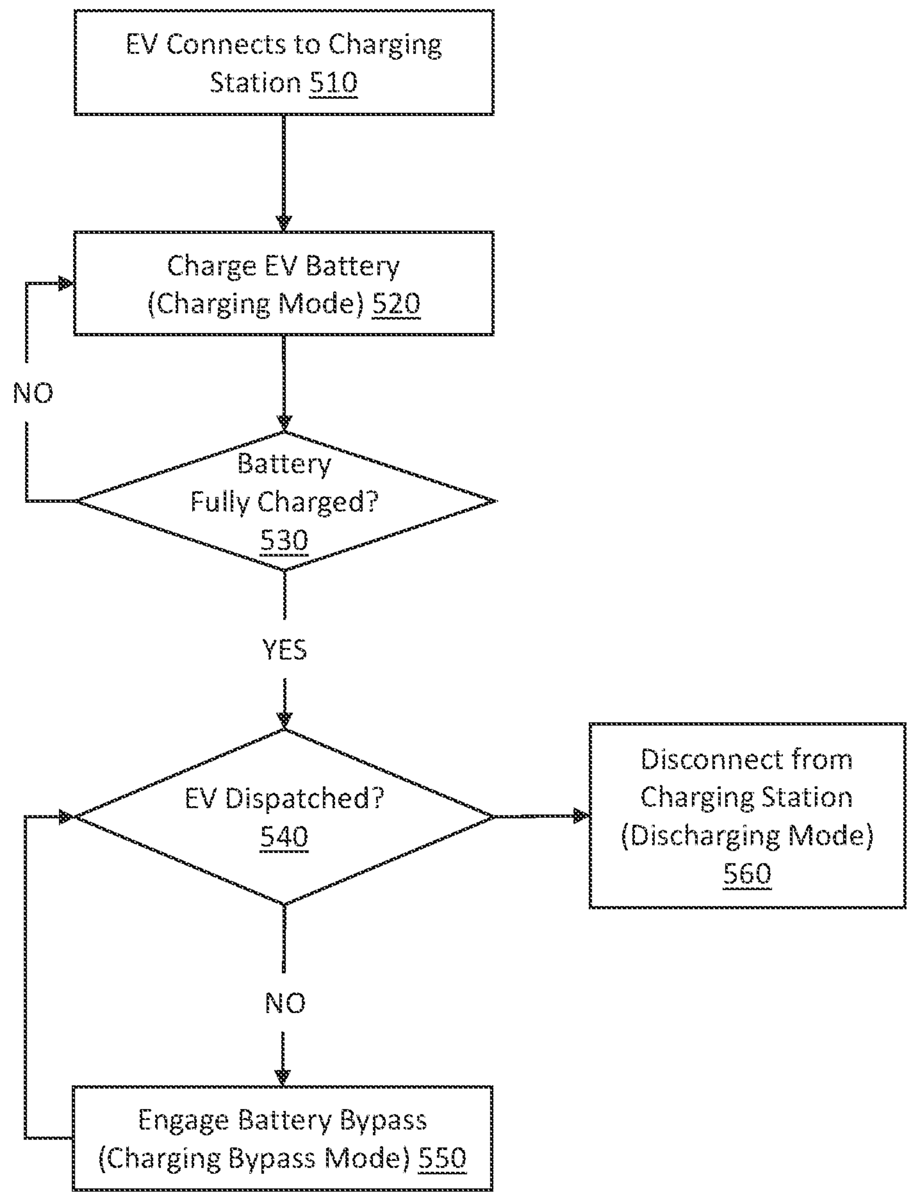
FIG. 5 is a flowchart showing a process for selecting and applying power modes of the EV according to some embodiments of the present disclosure.

FIG. 5 is a flowchart showing a process for selecting and applying power modes of the EV according to some embodiments of the present disclosure. An EV, such as EV 110, connects 510 to a charging station, such as charging station 130. The EV 110 may connect, or be connected to, to the charging station 130, e.g., with the cord and plug shown in FIG. 1, through a wireless communications connection, and/or through a wireless charging connection. In some embodiments, the EV 110 can connect to the charging station 130 to receive power autonomously, e.g., without a manual connection. In other embodiments, the EV 110 is manually plugged into the charging station 130. In response to the EV 110 connecting to the charging station 130, the EV 110 and/or the charging station 130 transmits a signal to the fleet management system 120 indicating that the EV 110 has connected to the charging station 130.

The charging station 130 charges 520 the EV battery 150 in a charging mode. In the charging mode, the power distribution module 220 receives power from either the on-board charger 210 or directly from the charging station 130. The power distribution module 220 distributes power to a subset of the subsystems 230, e.g., a set of subsystems 230 that continue to operate while the EV 110 is idle. The power distribution module 220 also distributes power to the battery 150. The battery bypass module 240 is not engaged.

The power system controller 250 determines 530 if the battery 150 is fully charged. If the battery 150 is not fully charged, the power system controller 250 keeps the power system 160 in the charging mode. If the battery 150 is fully charged, the power system controller 250 checks 540 if the EV 110 has been dispatched by the fleet management system 120. For example, the EV 110 may have been assigned a service request. Or, the EV 110 may have been instructed to disconnect from the charging station 130 so that another EV can be charged.

If the EV 110 has been dispatched, the EV 110 disconnects 560 from the charging station 130, and the power system controller 250 implements the discharging mode. In the discharging mode, the power distribution module 220 draws power from the battery 150 and distributes the power to a subset of the subsystems 230 (e.g., if the EV 110 is idle and awaiting a service assignment), or all of the subsystems 230 (e.g., if the EV 110 is driving).

If the EV 110 has not been dispatched, the power system controller 250 engages 550 battery bypass module 240 in the charging bypass mode. In the charging bypass mode, the power distribution module 220 receives power from either the on-board charger 210 or directly from the charging station 130, and the power distribution module 220 distributes power to a subset of the subsystems 230, e.g., the set of subsystems 230 that continue to operate while the EV 110 is idle. Power bypasses the battery 150. During the charging bypass mode, the power system controller 250 continues to check if the EV 110 has been dispatched. In response to the EV being dispatched, the power system controller disengages the battery bypass module 240 and enters the discharging mode.

Select Examples

Example 1 provides a system for powering an electric vehicle (EV) that includes a battery, a power distribution module, and a battery bypass module. The power distribution module is configured to receive power from a charging station, draw power from the battery in a discharging mode, distribute power from the charging station to the battery in a charging mode, and distribute power to a plurality of subsystems of the EV. The battery bypass module is coupled to the battery and to the power distribution module. The battery bypass module, when engaged in a charging bypass mode, causes power distributed by the power distribution module to bypass the battery and to be distributed to at least a subset of the plurality of subsystems of the EV.

Example 2 provides the system according to example 1, further including a power system controller configured to determine that the battery has reached a full charge level, engage the charging bypass mode of the battery bypass module in response to the battery reaching the full charge level, and disengage the charging bypass mode of the battery bypass module in response to the EV disconnecting from the charging station.

Example 3 provides the system according to example 1 or 2, further including a power system controller configured to select at least one subsystem of the EV to enable during the charging bypass mode, and transmit instructions to the power distribution module to distribute power to the at least one subsystem of the EV while the charging bypass mode is engaged.

Example 4 provides the system according to example 3, where the power system controller is further configured to select at least a second subsystem of the EV to disable during the charging bypass mode, and transmit instructions to the power distribution module to not distribute power to the second subsystem of the EV while the charging bypass mode is engaged.

Example 5 provides the system according to any of the preceding examples, further including a charging manager configured to identify the charging station from which the EV is receiving power, retrieve data describing demand for the charging station by a fleet of EVs, the fleet comprising the EV, and in response to determining that the charging station is available to the EV after the battery has reached a full charge, instruct the EV to engage the charging bypass mode.

Example 6 provides the system according to any of the preceding examples, further including a fleet management system configured to receive a service request from a user; assign the service request to a second EV in a fleet of EVs, the fleet comprising the EV; instruct the EV to engage the charging bypass mode; receive a second service request from a second user; and assign the second service request to the EV, where the EV disengages the charging bypass mode in response to receiving the service request.

Example 7 provides the system according to any of the preceding examples, further including a charging manager configured to determine a cost of powering the subset of the plurality of subsystems by the charging station, determine a cost of powering the subset of the plurality of subsystems from the battery, and, in response to determining that the cost of powering the subset of the plurality of subsystems by the charging station is lower than the cost of powering the subset of the plurality of subsystems from the battery, transmit an instruction to engage the charging bypass mode.

Example 8 provides the method according to example 7, where determining the cost of powering the subset of the plurality of subsystems by the charging station includes calculating an estimated power draw rate for powering the subset of the plurality of subsystems of the EV, retrieving current electricity rates for the charging station, and calculating the cost of powering the subset of the plurality of subsystems based on the current electricity rates and the estimated power draw.

Example 9 provides the method according to example 7 or 8, where determining the cost of powering the subset of the plurality of subsystems from the battery includes calculating a degradation cost to the battery associated with powering the plurality of subsystems from the battery, calculating an estimated cost of recharging the battery, and determining the cost of powering the subset of the plurality of subsystems from the battery based on the degradation cost and the estimated cost of recharging the battery.

Example 10 provides the system according to any of the preceding examples, further including an on-board charger configured to convert alternating current (AC) received from the charging station to direct current (DC), wherein the power distribution module is configured to receive power from a DC charging station or from the charging station via the on-board charger.

Example 11 provides a method for powering an electric vehicle (EV) including receiving, at a power distribution module of the EV, power from a charging station; during a charging mode, distributing, from the power distribution module, power received from the charging station to a battery of the EV; during a discharging mode, drawing, by the power distribution module, power from the battery and distributing the power from the battery to a plurality of subsystems of the EV; and during a charging bypass mode, drawing, by the power distribution module, power from the charging station and distributing the power from the charging station to the plurality of subsystems of the EV, wherein the power distributed by the power distribution module bypasses the battery during the charging bypass mode.

Example 12 provides the method according to example 11, further including determining that the battery has reached a full charge level during the charging mode; in response to the battery reaching the full charge level, engaging the charging bypass mode of the battery bypass module; and disengaging the charging bypass mode of the battery bypass module in response to the EV disconnecting from the charging station.

Example 13 provides the method according to example 11 or 12, further including selecting at least one subsystem of the EV to enable during the charging bypass mode, selecting at least a second subsystem of the EV to disable during the charging bypass mode, and transmitting instructions to the power distribution module to distribute power to the at least one subsystem of the EV while the charging bypass mode is engaged.

Example 14 provides the method according to any of examples 11 through 13, further including retrieving data describing demand for charging stations by EVs in a fleet of EVs, the fleet comprising the EV; and in response to determining that the charging station is available to the EV after the battery has reached a full charge, instructing the EV to engage the charging bypass mode.

Example 15 provides the method according to any of examples 11 through 14, further including receiving a service request from a user; assigning the service request to a second EV in a fleet of EVs, the fleet comprising the EV; instructing the EV to engage the charging bypass mode; receiving a second service request from a second user; and assigning the second service request to the EV, where the EV disengages the charging bypass mode in response to receiving the service request.

Example 16 provides the method according to any of examples 11 through 15, further including determining a cost of powering the subset of the plurality of subsystems by the charging station; determining a cost of powering the subset of the plurality of subsystems from the battery; and in response to determining that the cost of powering the subset of the plurality of subsystems by the charging station is lower than the cost of powering the subset of the plurality of subsystems from the battery, transmitting an instruction to engage the charging bypass mode.

Example 17 provides the method according to example 16, where determining the cost of powering the subset of the plurality of subsystems by the charging station includes calculating an estimated power draw rate for powering the subset of the plurality of subsystems of the EV; retrieving current electricity rates for the charging station; and calculating the cost of powering the subset of the plurality of subsystems based on the current electricity rates and the estimated power draw.

Example 18 provides the method according to example 16 or 17, where determining the cost of powering the subset of the plurality of subsystems from the battery includes calculating a degradation cost to the battery associated with powering the plurality of subsystems from the battery; calculating an estimated cost of recharging the battery; and determining the cost of powering the subset of the plurality of subsystems from the battery based on the degradation cost and the estimated cost of recharging the battery.

Example 19 provides a fleet management system comprising a vehicle manager configured to receive service requests from users and assign the service requests to EVs in a fleet of EVs; and a charging manager configured to identify, based on data from the vehicle manager, an idle EV of the fleet of EVs, the idle EV not currently assigned by the vehicle manager to a service request; and instruct the idle EV to engage a charging bypass mode while connected to a charging station, the charging bypass mode causing power received from the charging station to bypass a battery of the idle EV and to be distributed to at least a subset of the plurality of subsystems of the idle EV.

Example 20 provides the fleet management system according to example 19, where the charging manager is further configured to instruct the idle EV to engage the charging bypass mode in response to determining that the battery of the EV is fully charged, and in response to the vehicle manager assigning a service request to the idle EV, instruct the idle EV to disengage the charging bypass mode.

OTHER IMPLEMENTATION NOTES, VARIATIONS, AND APPLICATIONS

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

In one example embodiment, any number of electrical circuits of the figures may be implemented on a board of an associated electronic device. The board can be a general circuit board that can hold various components of the internal electronic system of the electronic device and, further, provide connectors for other peripherals. More specifically, the board can provide the electrical connections by which the other components of the system can communicate electrically. Any suitable processors (inclusive of digital signal processors, microprocessors, supporting chipsets, etc.), computer-readable non-transitory memory elements, etc. can be suitably coupled to the board based on particular configuration needs, processing demands, computer designs, etc. Other components such as external storage, additional sensors, controllers for audio/video display, and peripheral devices may be attached to the board as plug-in cards, via cables, or integrated into the board itself. In various embodiments, the functionalities described herein may be implemented in emulation form as software or firmware running within one or more configurable (e.g., programmable) elements arranged in a structure that supports these functions. The software or firmware providing the emulation may be provided on non-transitory computer-readable storage medium comprising instructions to allow a processor to carry out those functionalities.

It is also imperative to note that all of the specifications, dimensions, and relationships outlined herein (e.g., the number of processors, logic operations, etc.) have only been offered for purposes of example and teaching only. Such information may be varied considerably without departing from the spirit of the present disclosure, or the scope of the appended claims. The specifications apply only to one non-limiting example and, accordingly, they should be construed as such. In the foregoing description, example embodiments have been described with reference to particular arrangements of components. Various modifications and changes may be made to such embodiments without departing from the scope of the appended claims. The description and drawings are, accordingly, to be regarded in an illustrative rather than in a restrictive sense.

Note that with the numerous examples provided herein, interaction may be described in terms of two, three, four, or more components. However, this has been done for purposes of clarity and example only. It should be appreciated that the system can be consolidated in any suitable manner. Along similar design alternatives, any of the illustrated components, modules, and elements of the FIGS. may be combined in various possible configurations, all of which are clearly within the broad scope of this Specification.

Note that in this Specification, references to various features (e.g., elements, structures, modules, components, steps, operations, characteristics, etc.) included in "one embodiment", "example embodiment", "an embodiment", "another embodiment", "some embodiments", "various embodiments", "other embodiments", "alternative embodiment", and the like are intended to mean that any such features are included in one or more embodiments of the present disclosure, but may or may not necessarily be combined in the same embodiments.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. Note that all optional features of the systems and methods described above may also be implemented with respect to the methods or systems described herein and specifics in the examples may be used anywhere in one or more embodiments.

In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph (f) of 35 U.S.C. Section 112 as it exists on the date of the filing hereof unless the words "means for" or "step for" are specifically used in the particular claims; and (b) does not intend, by any statement in the Specification, to limit this disclosure in any way that is not otherwise reflected in the appended claims.

What is claimed is:

1. An electric vehicle (EV) comprising:
- a battery;
- a plurality of sensors arranged at different locations on the EV;
- an onboard computer coupled to the plurality of sensors, the onboard computer programmed to process data received from the plurality of sensors and control autonomous driving of the EV based on the processed data;
- a power distribution module configured to receive power from a charging station, draw power from the battery in a discharging mode, distribute power from the charging station to the battery in a charging mode, and distribute power to the plurality of sensors; and
- a battery bypass module coupled to the battery and to the power distribution module, wherein the battery bypass module, when engaged in a charging bypass mode, causes power received from the charging station and distributed by the power distribution module to bypass the battery and to be distributed to at least a subset of the plurality of sensors.

2. The EV of claim 1, further comprising a communications system, wherein the power distribution module is configured to distribute power to the communications systems, and the battery bypass module, when engaged in the charging bypass mode, causes power to be distributed to the communications system.

3. The EV of claim 2, wherein the communications system is to receive, during the charging bypass mode, an instruction from a fleet management system to disconnect from the charging station and to autonomously drive to a specified location.

4. The EV of claim 3, wherein, in response to the instruction, the battery bypass module is to disengage the charging bypass mode.

5. The EV of claim 2, wherein the communications system is to receive, from a fleet management system, an instruction to engage the charging bypass mode, and the battery bypass module is to engage the charging bypass mode in response to the instruction.

6. The EV of claim 5, wherein, during the charging bypass mode, the onboard computer processes data received from the subset of the plurality of sensors to monitor a local environment of the EV.

7. The EV of claim 1, wherein the battery bypass module, when engaged in the charging bypass mode, further causes power to be distributed to the onboard computer.

8. The EV of claim 1, wherein the battery bypass module, when engaged in the charging bypass mode, does not cause power to be distributed to a vehicle propulsion system.

9. The EV of claim 1, further comprising a power system controller configured to:
- determine that the battery has reached a full charge level;
- engage the charging bypass mode of the battery bypass module in response to the battery reaching the full charge level; and
- disengage the charging bypass mode of the battery bypass module in response to the EV disconnecting from the charging station.

10. The EV of claim 1, wherein the plurality of sensors comprises a camera, a light detection and ranging (lidar) sensor, and a radar sensor.

11. A method for powering an electric vehicle (EV), the method comprising:
- receiving, at a power distribution module of the EV, power from a charging station;
- during a charging mode, distributing, from the power distribution module, power received from the charging station to a battery of the EV; and
- during a charging bypass mode, drawing, by the power distribution module, power from the charging station and distributing the power from the charging station to:
  - a plurality of sensors of the EV, the plurality of sensors arranged at different locations around the EV, and
  - an onboard computer of the EV, the onboard computer programmed to process data received from the plurality of sensors and control autonomous driving of the EV based on the processed data;
- wherein the power distributed by the power distribution module bypasses the battery during the charging bypass mode.

12. The method of claim 11, further comprising:
- during a discharging mode, drawing, by the power distribution module, power from the battery and distributing the power from the battery to the plurality of sensors, the onboard computer, and a propulsion system of the EV.

13. The method of claim 11, the EV further comprising a communications system, the method further comprising:
- distributing the power from the charging station to the communications system during the charging bypass mode.

14. The method of claim 13, further comprising:
- receiving, by the communications system during the charging bypass mode, an instruction from a fleet management system for the EV to disconnect from the charging station and to autonomously drive to a specified location.

15. The method of claim 14, further comprising:
- in response to the instruction, disengaging the charging bypass mode.

16. The method of claim 13, further comprising:
- receiving, from a fleet management system by the communications system, an instruction to engage the charging bypass mode; and
- engaging the charging bypass mode in response to the instruction.

17. The method of claim 16, further comprising:
- during the charging bypass mode, processing, by the onboard computer, data received from the plurality of sensors to monitor a local environment of the EV.

18. The method of claim 11, wherein the battery bypass module, when engaged in the charging bypass mode, does not cause power to be distributed to a vehicle propulsion system.

19. The method of claim 11, further comprising:

determining that the battery has reached a full charge level during the charging mode;

in response to the battery reaching the full charge level, engaging the charging bypass mode of the battery bypass module; and disengaging the charging bypass mode of the battery bypass module in response to the EV disconnecting from the charging station.

20. The method of claim 11, wherein the plurality of sensors comprises a camera, a light detection and ranging (lidar) sensor, and a radar sensor.

* * * * *